(12) United States Patent
Huffman et al.

(10) Patent No.: US 11,415,258 B2
(45) Date of Patent: Aug. 16, 2022

(54) PIPELINE PLUG

(71) Applicant: Mueller International, LLC, Atlanta, GA (US)

(72) Inventors: Jeffrey Allen Huffman, Monticello, IL (US); Jeffrey Dan Batson, Oreana, IL (US)

(73) Assignee: Mueller International, LLC, Atlanta, GA (US)

( * ) Notice: Subject to any disclaimer, the term of this patent is extended or adjusted under 35 U.S.C. 154(b) by 522 days.

(21) Appl. No.: 16/584,319

(22) Filed: Sep. 26, 2019

(65) Prior Publication Data

US 2020/0018435 A1 Jan. 16, 2020

Related U.S. Application Data

(62) Division of application No. 15/702,325, filed on Sep. 12, 2017, now Pat. No. 10,465,833.

(51) Int. Cl.
*B23P 15/00* (2006.01)
*F16L 55/128* (2006.01)
*F16L 55/11* (2006.01)
*F16L 55/18* (2006.01)
*F16L 101/12* (2006.01)

(52) U.S. Cl.
CPC ............ *F16L 55/1283* (2013.01); *B23P 15/00* (2013.01); *F16L 55/1116* (2013.01); *F16L 55/1141* (2013.01); *F16L 55/18* (2013.01); *F16L 2101/12* (2013.01)

(58) Field of Classification Search
CPC ............... F16L 55/1283; F16L 55/1116; F16L 55/1141; F16L 55/18; F16L 2101/12; B23P 15/00; B29D 23/003
See application file for complete search history.

(56) References Cited

U.S. PATENT DOCUMENTS

| 876,301 | A | 1/1908 | Cunningham |
| 2,176,682 | A | 10/1939 | Pedrick |
| 2,937,894 | A | 5/1960 | Martin et al. |
| 3,032,867 | A | 5/1962 | Kerr |
| 3,998,245 | A | 12/1976 | Martin |
| 4,108,194 | A | 8/1978 | Harrison et al. |
| 4,452,278 | A | 6/1984 | Quinn |
| 4,463,597 | A | 8/1984 | Pierce et al. |
| 5,146,061 | A * | 9/1992 | Huebler ................. B23H 1/04 219/69.15 |
| 6,659,133 | B2 | 12/2003 | Russell |
| 6,691,733 | B1 | 2/2004 | Morris |
| 7,281,543 | B2 | 10/2007 | Calkins et al. |

(Continued)

OTHER PUBLICATIONS

Huffman, Jeffrey Allen; Non-Final Office Action for U.S. Appl. No. 15/702,325, filed Sep. 12, 2017, dated Mar. 8, 2019, 13 pgs.

(Continued)

*Primary Examiner* — Lawrence Averick
(74) *Attorney, Agent, or Firm* — Taylor English Duma LLP

(57) ABSTRACT

A method of manufacturing a plug for a pipe system includes cutting a plug from a length of pipe, the length of pipe defining a pipe bore, the pipe bore defining an inner diameter equal to an inner diameter of a main bore of the plug, the plug including a top portion defining a top diameter, a bottom portion defining a bottom diameter, and a web portion joining the top portion and the bottom portion.

20 Claims, 11 Drawing Sheets

(56) References Cited

U.S. PATENT DOCUMENTS

| | | | | |
|---|---|---|---|---|
| 7,748,411 | B2* | 7/2010 | German | F16L 55/46 137/317 |
| 8,071,927 | B2* | 12/2011 | Hilgemann | G02B 19/0023 244/3.1 |
| 8,887,768 | B2 | 11/2014 | Hart et al. | |
| 9,764,404 | B2* | 9/2017 | Eckert | B23H 7/20 |
| 9,834,832 | B2* | 12/2017 | Branagan | B22D 13/023 |
| 10,465,833 | B2 | 11/2019 | Huffman et al. | |
| 2004/0222626 | A1* | 11/2004 | Baruh | F16L 21/002 285/31 |
| 2005/0189509 | A1 | 9/2005 | Peric | |
| 2005/0241711 | A1 | 11/2005 | Sayers et al. | |
| 2007/0028982 | A1* | 2/2007 | German | F16L 55/40 138/90 |
| 2009/0294574 | A1* | 12/2009 | Hilgemann | F41G 7/226 244/3.1 |
| 2014/0183165 | A1* | 7/2014 | Eckert | F22B 37/003 219/69.15 |
| 2014/0190594 | A1* | 7/2014 | Branagan | C22C 38/54 148/330 |
| 2019/0078718 | A1 | 3/2019 | Huffman et al. | |

OTHER PUBLICATIONS

Huffman, Jeffrey Allen; Notice of Allowance for U.S. Appl. No. 15/702,325, filed Sep. 12, 2017, dated Jul. 1, 2019, 10 pgs.

Huffman, Jeffrey Allen; Requirement for Restriction/Election for U.S. Appl. No. 15/702,325, filed Sep. 12, 2017, dated Jan. 24, 2019, 8 pgs.

Mueller Co.; Brochure for Mueller Pig-Plug Line Stopper Fitting Insert, Copyright 2006, 2 pgs.

Mueller Co.; Brochure for Mueller Pig-Plug Line Stopper Fitting Insert, publicly available prior to Sep. 12, 2017, 2 pgs.

Mueller Co.; Catalog for Mueller 3"-12" NO-BLO Line Stopper Fittings—Maximum Pressures, publicly available prior to Sep. 12, 2017, 116 pgs.

Mueller Co.; Operating Instructions for Inserting and Extracting 10" & 12" 'Pig-Friendly' Plugs, published Aug. 2016, 2 pgs.

Mueller Product Demonstration: Mueller NO-BLO® Line Stopping System, located at <https://www.youtube.com/watch?v-fLVGwjcOdzc>, published on Apr. 11, 2016, 1 pg.

T.D. Williamson, Inc.; Bulletin entitled: "Lock-O-Ring Flanges & Plugs—Sizes 4-Through 36-inch", dated Apr. 2009, 6 pgs.

* cited by examiner

PIPELINE PLUG

REFERENCE TO RELATED APPLICATIONS

This application is a divisional of U.S. application Ser. No. 15/702,325, filed Sep. 12, 2017, which is hereby specifically incorporated by reference herein in its entirety.

TECHNICAL FIELD

Field of Use

This disclosure relates to pipe systems. More specifically, this disclosure relates to plugs for pipe systems that can facilitate smooth passage of a "pig."

Related Art

When repairing a pipeline, it can be necessary to inhibit flow of a fluid, such as natural gas or water, in the pipeline and isolate the pipeline by inserting a plug into the pipeline at a location such as, for example and without limitation, a pipeline fitting. When the repair work is finished, the plug can be removed and a completion plug can be installed, sealing the fitting. Pipeline fittings used for this purpose typically require that a hole be drilled through one pipe wall or opposing walls. In either case, any hole or aperture in the pipe wall can interfere with the travel of a "pig" through the pipeline. A pig is a device inserted into and made to travel along a pipeline to perform a task within the pipeline such as remove wall debris or assess wall thickness. According to some sources, a pig was named based on the sound it makes while traveling through a pipe system or as an acronym or "backronym" for a Pipeline Inspection Gauge. A pig that cannot pass through the pipeline fitting and becomes lodged can be damaged or can damage the pipeline or fitting. This can result in costly repairs and can require manual movement of the pig downstream past the area of interference, which can increase the cost of such work and make it more difficult or even impossible to complete the work. A clog due to a pig that is lodged in the pipeline can additionally result in a financial loss or major inconvenience due to users' inability to use the affected pipeline.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a plug for a pipeline, the plug comprising: a top portion defining a top bore, the top bore defining a top diameter; a bottom portion defining a bottom bore, the bottom bore defining a bottom diameter; and a web portion joining the top portion and the bottom portion; the top portion, the bottom portion, and the web portion defining a main bore, the main bore defining a longitudinal axis of the plug and defining a circular shape around the longitudinal axis of the plug; the top portion, the bottom portion, and the web portion further defining a substantially circular shape around a transverse axis of the plug that extends through the top portion and the bottom portion and is perpendicular to the longitudinal axis.

In a further aspect, disclosed is a pipe system comprising: a pipe defining an inner surface, an outer surface, and a longitudinal axis; a fitting assembled on the pipe; and a plug positioned in the pipe and in the fitting, the plug comprising: a top portion defining a top bore, the top bore defining a top diameter; a bottom portion defining a bottom bore, the bottom bore defining a bottom diameter; and wherein the top portion and the bottom portion define a main bore, the main bore defining a longitudinal axis of the plug; the plug defining a substantially circular shape around the longitudinal axis of the plug, the longitudinal axis of the plug aligned with the longitudinal axis of the pipe.

In yet another aspect, disclosed is a method of manufacturing a plug for a pipe system, the method comprising: cutting a plug from a length of pipe, the length of pipe defining a pipe bore, the pipe bore defining an inner diameter equal to an inner diameter of a main bore of the plug, the plug comprising a top portion defining a top diameter, a bottom portion defining a bottom diameter, and a web portion joining the top portion and the bottom portion; and securing stiffeners to the inner bore of the plug proximate to the web portion of the plug to reinforce the plug at the web portion.

In yet another aspect, disclosed is a method of manufacturing a plug for a pipe system, the method comprising: cutting a plug from a length of pipe, the length of pipe defining a pipe bore, the pipe bore defining an inner diameter equal to an inner diameter of a main bore of the plug, the plug comprising a top portion defining a top diameter, a bottom portion defining a bottom diameter, and a web portion joining the top portion and the bottom portion.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
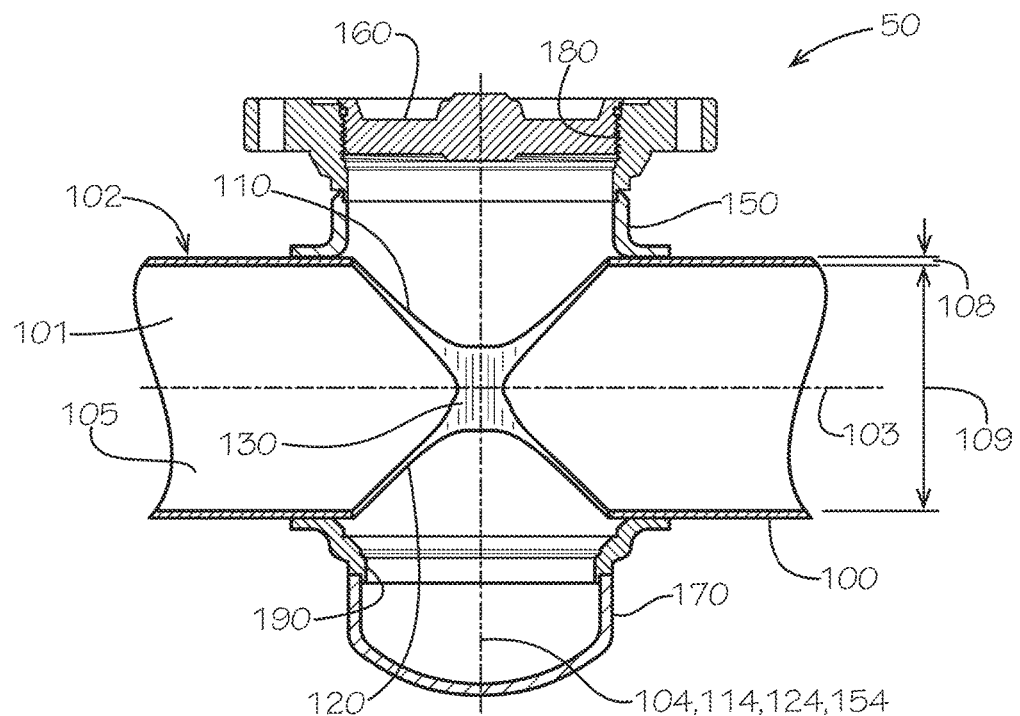
FIG. 1 is a sectional view of a pipe system comprising a pipe and a fitting in accordance with one aspect of the current disclosure and taken along line 1-1 of FIG. 2 but with a cap and cap fasteners of the fitting removed.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that axial end of the structural element, e.g., a plug or a fitting, that is positioned downstream and distal from the upstream end or inlet; "rear" is that end of the plug or the fitting that is opposite or distal the front; "left" is that which is to the left of or facing left from a person facing towards the front while looking upstream along the central axis of the plug or the fitting; and "right" is that which is to the right of or facing right from that same person. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect of the current disclosure, a plug for a pipe system and associated methods, systems, devices, and various apparatuses are disclosed herein. The plug can be fabricated from a similar or identical material or similar or identical dimensions as the pipe in which it is positioned. The plug can comprise a positioning member.

As shown in FIG. 1, a pipe system 50, which can comprise a pipeline that can comprise individual pipes such as a pipe 100, can be used to efficiently transfer fluids such as, for example and without limitation, natural gas over a distance from a first location to a second location. Over time, however, waste can build up inside the pipes 100 of the pipe system 50. Additionally, a pipe wall of the pipes 100 can begin to deteriorate depending on the installation environment or the fluid being transported. When this occurs or to determine whether this has occurred, a "pig" 200 (shown in FIG. 2) can be inserted into the pipe system 50 to clean the walls of the pipe 100 or to inspect the pipe system 50 (e.g., to assess a pipe wall thickness 108 in a radial direction relative to a longitudinal axis 103 of the pipe 100 and/or to check for deformation of the pipe 100). The pig 200 itself can be driven by the fluid flowing inside the pipe system 50.

As shown in FIG. 1, the pipe 100 of the pipe system 50 can define an inner surface 101 and an outer surface 102 and can define apertures in these surfaces at various points along the length of the pipe 100. Such apertures can be positioned, for example and without limitation, proximate to or aligned with a fitting 150 of the pipe system 50 and can extend from the inner surface 101 to the outer surface 102 to allow access into the pipe 100. For example and without limitation, the pipe 100 can define a top aperture 110 and a bottom aperture 120 that each extend from the inner surface 101 to the outer surface 102. The fitting 150, which can be a stopping fitting, can comprise a completion plug 160 that closes and seals a top opening 180 of the fitting 150 and a cap 170 that closes and seals a bottom opening 190 of the fitting 150. The pipe 100 can further define a pipe bore 105 defining an inner diameter 109.

The pipe 100 can define a transverse axis 104, each of the top aperture 110 and the bottom aperture 120 can define respective transverse axes 114,125, and the fitting 150 can define a transverse axis 154. Proximate to where the top aperture 110 and the bottom aperture 120 are defined in the pipe 100, the pipe 100 can further define a web portion 130 extending between the top aperture 110 and the bottom aperture 120. The web portion 130 can define a thickness in a radial direction relative to the longitudinal axis 103 of the pipe 100 that is less than the pipe wall thickness 108 and can be formed when the pipe 100 is cut to form the top aperture 110 and the bottom aperture 120, e.g., by a shell cutter known in the art. In some aspects, as shown, the transverse axes 104, 114, 124, 154 can all be aligned with each other. In other aspects, the transverse axes 104, 114, 124, 154 need not be aligned with each other or only some of the transverse axes 104, 114, 124, 154 can be aligned with each other.

When the pig 200 is traveling through the pipe system 50 through and past the top aperture 110 and the bottom aperture 120, a longitudinal axis 203 (shown in FIG. 2) of the pig 200 can fall off or otherwise become misaligned with the longitudinal axis 103 of the pipe 100, at least if there is no pipe wall to guide the pig 200 at the top aperture 110 and the bottom aperture 120. Upon misalignment of the pig 200 with the longitudinal axis 103, the pig 200 can become lodged or stuck in the fitting 150. Additionally, sensors (not shown) attached to the pig 200 or other parts of the pig 200 can be damaged or even destroyed by the edges of the top aperture 110 or the bottom aperture 120, which can be sharp. A lodged or damaged pig 200 can result in at least a portion of the pipe system 50 becoming damaged or unavailable, which can further result in a potential loss of profits or other benefits that would otherwise be available from smooth operation of the pipe system 50.

Figure 2:
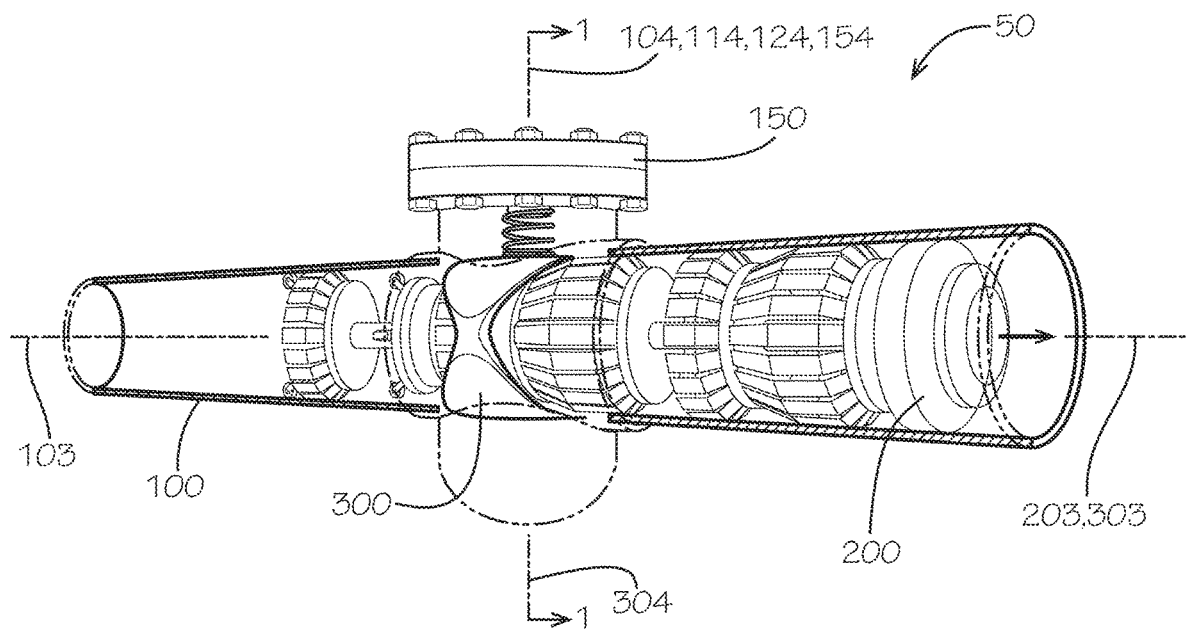
FIG. 2 is perspective view of the system of FIG. 1 further comprising a pig passing through a plug installed inside the fitting.

As shown in FIG. 2, a plug 300 can facilitate free travel of the pig 200 through the pipe system 50, especially where apertures such as the top aperture 110 and the bottom aperture 120 are defined in the pipe 100 such as at the fitting 150. The plug 300 can define a longitudinal axis 303 and a transverse axis 304. The transverse axis 304 can intersect the longitudinal axis 303 at a 90-degree angle.

Figure 3:
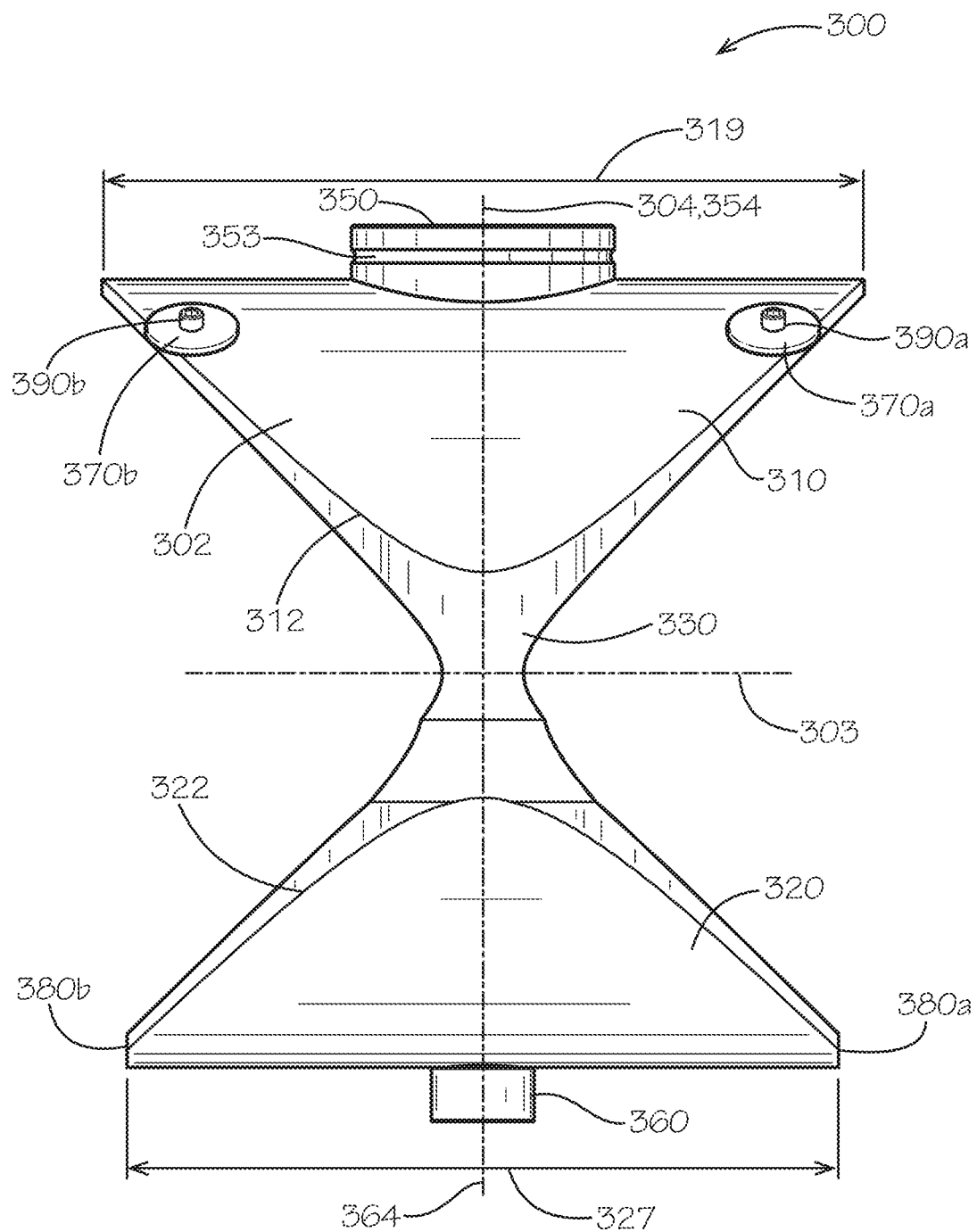
FIG. 3 is a side view of the plug of FIG. 2.
Figure 4:
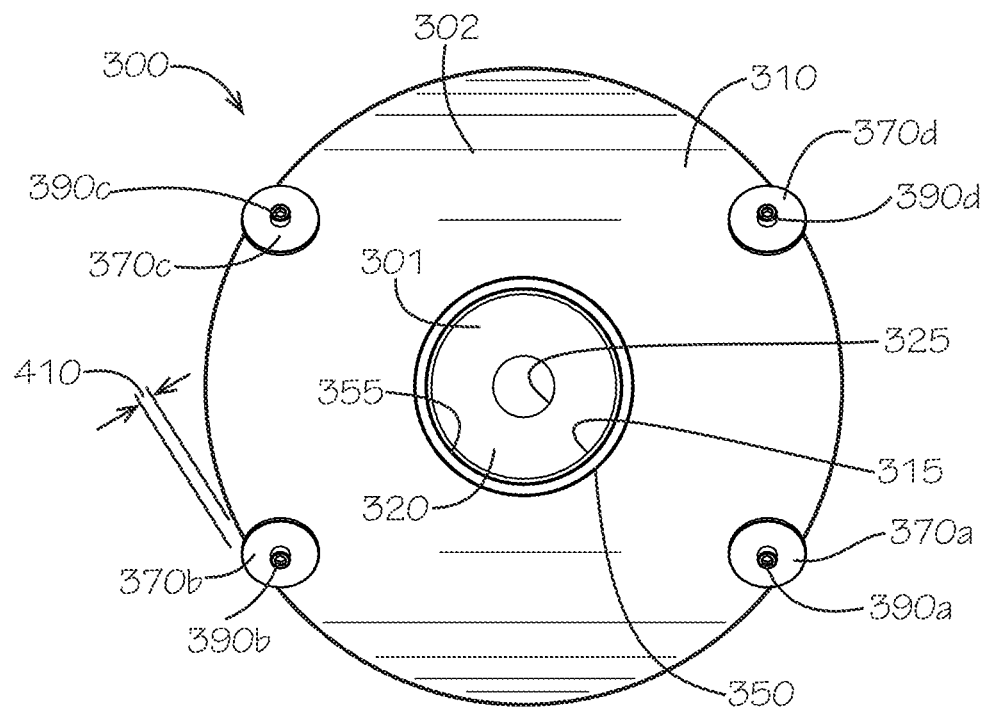
FIG. 4 is a top view of the plug of FIG. 2.

FIG. 3 shows the plug 300. The plug 300 can define an inner surface 301 (shown in FIG. 4) and an outer surface 302. The plug 300 can comprise a top portion 310 defining a top bore 315 (shown in FIG. 4), which can define a bore diameter 318 (shown in FIG. 7), measured as shown. The plug 300 can comprise a bottom portion 320 defining a bottom bore 325 (shown in FIG. 4), which can define a bore diameter 328 (shown in FIG. 7), measured as shown. The plug 300 can comprise a web portion 330, which can join the top portion 310 and the bottom portion 320. The top portion 310 can further define a top diameter 319, which can be equal to an axial length at the top of the plug 300. The bottom portion 320 can further define a bottom diameter 329 (shown in FIG. 11) and an axial length 327. In some aspects, the bottom portion 320 can define truncated ends 380a,b. The bottom diameter 329 can be greater than the axial length 327 of the top portion 310, including when the truncated ends 380a,b are present. In other aspects, the bottom diameter 329 can be equal to the axial length 327. The outer surface 302 can define an edge 312 of the top portion 310, which can define an intersection between the top portion 310 and the web portion 330. Likewise, the outer surface 302 can define an edge 322 of the bottom portion 320, which can define an intersection between the bottom portion 320 and the web portion 330. As described below, the web portion 330 can define a thickness in a radial direction relative to the longitudinal axis 303 that is less than a thickness 708 (shown in FIG. 7) of the top portion 310 of the plug 300 in the radial direction relative to the longitudinal axis 303. The bottom portion 320 defines a thickness in the radial direction relative to the longitudinal axis 303 that can be equal to thickness 708. The web portion 330—together with the edges 312,322—can be formed when the plug 300 is cut from the pipe 100 with a substantially vertical cutting tool. In another aspect, the web portion 330—together with the edges 312,322—can be formed when the plug 300 is cut from the pipe 100 with a cutting tool that is angled at 90 degrees with respect to the longitudinal axis 103 of the pipe 100.

In some aspects, the size and shape of the top portion 310, including when viewed from the side (as in FIG. 3) and from the top (as in FIG. 4), can approximately match the size and shape of the top aperture 110 in the pipe 100. Likewise, in some aspects, the size and shape of the bottom portion 320, including when viewed from the side (as in FIG. 3) and from the bottom (as in FIG. 11), can approximately match the size and shape of the bottom aperture 120 in the pipe 100. The shape can be parabolic from the side and circular from the top or bottom. In other aspects, each of the top portion 310 and the bottom portion 320 can be made slightly smaller to account for manufacturing or installation tolerances that can necessitate a looser fit between the plug 300 and the pipe 100.

The plug 300 can further comprise a spring boss 350, which can be secured to the top portion 310. An axis 354 of the spring boss 350 can be aligned with the transverse axis 304 of the plug 300. The spring boss 350 can define a biasing element restraint 353, which can comprise an annular groove. The biasing element restraint 553 can be defined in an outer surface of the spring boss 350. The spring boss 350 can be secured to the outer surface 302 of the plug 300 by any suitable method such as, for example and without limitation, welding, threading, or press fits.

The plug 300 can further comprise a plug boss 360, which can be secured to the bottom portion 320. An axis 364 of the plug boss 360 can be aligned with the transverse axis 304 of the plug 300. The plug boss 360 can be secured to the outer surface 302 of the plug 300 by any suitable method such as, for example and without limitation, welding, threading, or press fits.

The plug 300 can comprise positioning members 370a, b, c, d (370c,d shown in FIG. 4), which can help fix the vertical position of the plug 300 in the pipe 100. In one aspect, each of the positioning members 370a, b, c, d can be secured to the outer surface 302 of the top portion 310. Each of the positioning members 370a, b, c, d can extend beyond the edge relative to the transverse axis or beyond the top diameter 319 of the top portion 310 of the plug 300 by an extension distance 410 (shown in FIG. 4). In some aspects, each of the positioning members 370a, b, c, d can be shaped like a flat washer and can be fastened to the top portion 310 by a corresponding fastener 390a, b, c, d (390c,d shown in FIG. 4).

Figure 5:
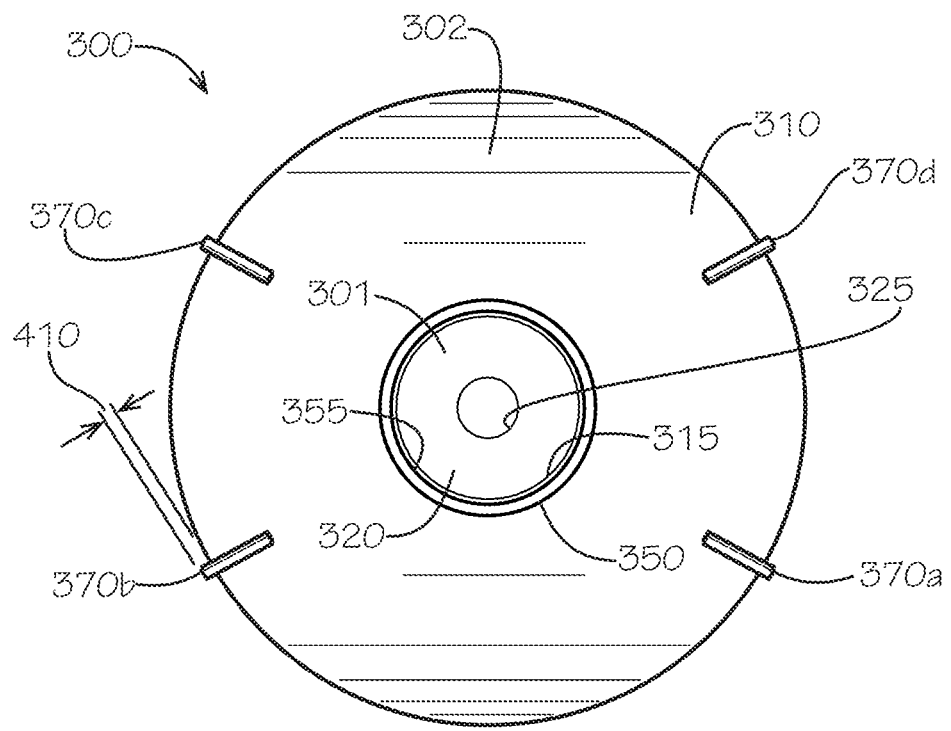
FIG. 5 is a top view of the plug of FIG. 2 in accordance with another aspect of the current disclosure.

In other aspects, as shown in FIG. 5, each of the positioning members 370a, b, c, d can comprise a bar, a plate, or another rigid shape, which can be fastened to the outer surface 302 of the top portion 310 of the plug 300 using any fastening method such as, for example and without limitation, a weldment or an adhesive. In yet other aspects, the material of the top portion 310 of the plug 300 can be formed into a plurality of steps (not shown) with a distance from the inner surface 301 of the plug 300 to an inner surface (i.e., radially inward facing surface) of the step equal to the pipe wall thickness 108 of the pipe 100 but having the same function as the positioning members 370a, b, c, d. In yet other aspects, the inner surface 301 of the plug 300 can be machined or notched or otherwise formed, optionally in combination with the aforementioned step, to create a ledge or flange on the plug 300 that is configured to positively locate the top portion 310 of the plug 300 relative to the pipe 100 such that that the longitudinal axis 303 of the plug 300 is aligned with the longitudinal axis 103 of the pipe 100. More specifically, each of the positioning members 370a, b, c, d can be configured to rest on the outer surface 302 of the pipe 100 when a main bore 340 (shown in FIG. 6) of the plug 300 is aligned with the longitudinal axis 103 of the pipe 100. As shown, the spring boss 350 can define a spring boss bore 355.

Figure 6:
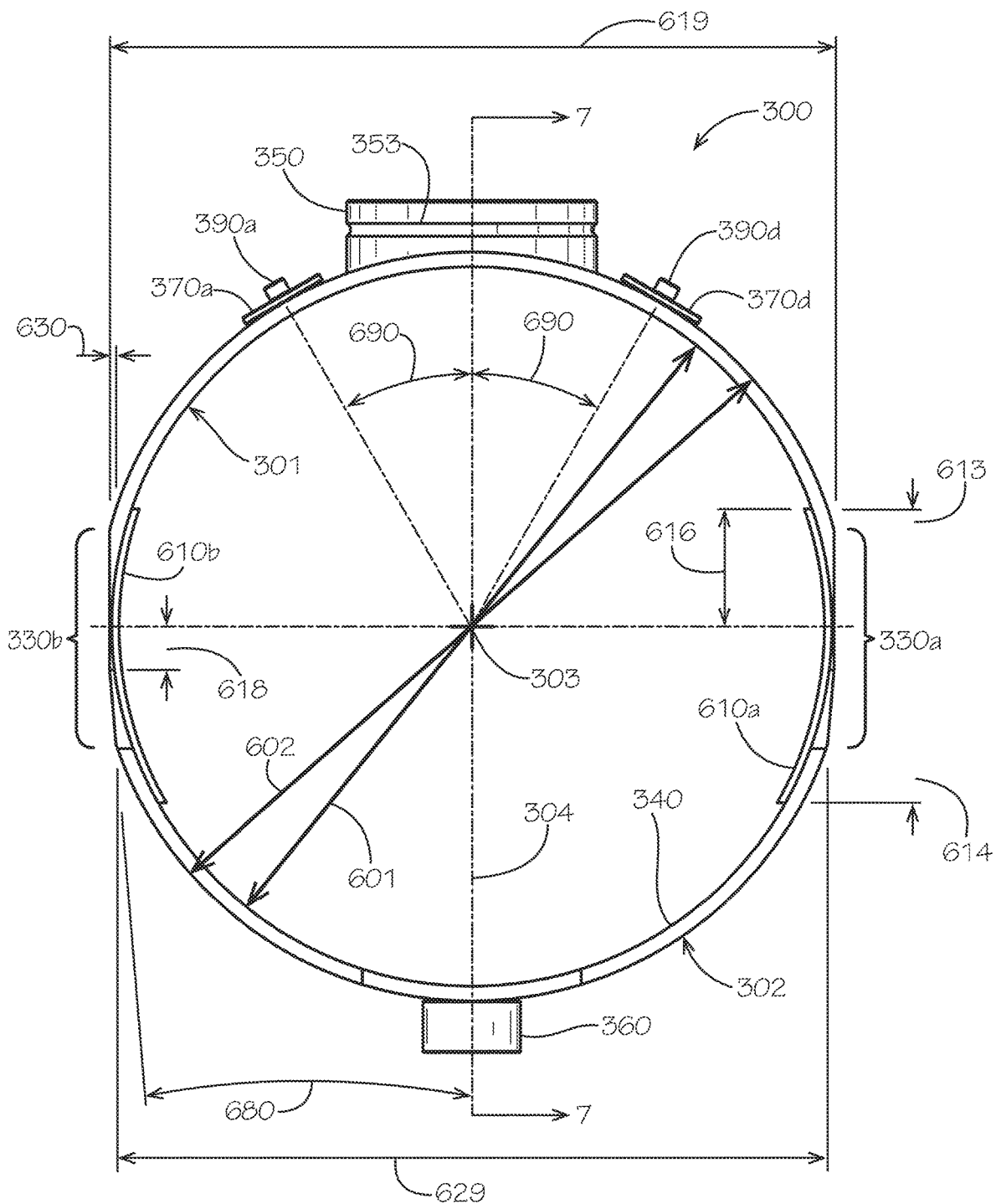
FIG. 6 is a front view of the plug of FIG. 2.

As shown in FIG. 6, the top portion 310, the bottom portion 320, and the web portion 330 can define the main bore 340 of the plug 300. The main bore 340 can define the longitudinal axis 303 of the plug 300 and can define a circular shape around the longitudinal axis 303 of the plug 300 in cross section and when viewing the plug 300 from the front, which can define an inner diameter 601. The inner diameter 601 of the main bore 340 of the plug 300 can be made substantially equal to the inner diameter 129 of the pipe 100.

The plug 300 can further define an outer diameter 602 as shown. Each of the top portion 310 and the bottom portion 320 can separately define a semicircular shape in cross-section and when viewing the plug 300 from the front.

In some aspects, as shown, each of the positioning members 370a, b, c, d can be positioned at a point on a circumference of the outer surface 302 of the top portion 310 of the plug 300 that is angled from the transverse axis 304 of the plug 300 by an angle 690 of 30 degrees. In other aspects, the angle 690 can be greater than or less than 30 degrees.

A thickness 708 (shown in FIG. 7) of a wall of the plug 300 in a radial direction relative to the longitudinal axis 303 can be reduced at the web portion 330 to a minimum thickness 630. More specifically, at each of a pair of web portion halves 330a,b the thickness of the plug 300 can be the minimum thickness 630. In one aspect, to compensate for the reduced thickness of the plug 300 at the web portion 330 (and web portion halves 330a,b), stiffeners 610a,b can be secured to the inner surface 301 of the plug 300, such as by welding or with adhesives. The stiffeners 610a,b can be used to reinforce the connection between the top portion 310, the bottom portion 320, and the web portion 330. Each of the stiffeners 610a,b can be a plate secured to the inner surface 301 of the main bore 340 of the plug 300. A top of each of the stiffeners 610a,b can be made to extend a vertical distance 616 from the longitudinal axis 303 of the plug 300, which can result in each of the stiffeners 610a,b extending a vertical distance 613 above the lowest part of the edge 312 (shown in FIG. 3) and a vertical distance 614 below the highest part of the edge 322 (shown in FIG. 3). In another aspect, as described below with respect to FIGS. 12 and 13, a stiffener 610 can be integrally formed from walls of the plug 300.

As shown in FIG. 6, the plug 300 can be tapered along the transverse axis 304. As reflected in FIG. 11, this taper can result in the top diameter 319 of the plug 300 being greater than the bottom diameter 329 of the plug 300. Likewise, a diameter of the top aperture 110 of the pipe 100 can be made greater than a diameter of the bottom aperture 120 of the pipe 100. A taper angle 680 can be defined relative to the transverse axis 304 and can define a taper starting at a vertical distance 618 below the longitudinal axis 303 of the plug 300. In some aspects, the angle 680 can be 5 degrees. In other aspects, the taper angle 680 can be greater than or less than 5 degrees. Also reflecting this taper, a top width 619 of the plug 300, which is a maximum width of the top portion 310 when viewed from the front, can be made larger than a bottom width 629 of the plug 300, which is a maximum width of the bottom portion 320 when viewed from the front. In some aspects, as shown, the top width 619 can also be a maximum outer width of the web portion 330 when viewed from the front and the bottom width 629 can also be a minimum outer width of the web portion 330 when viewed from the front.

Figure 7:
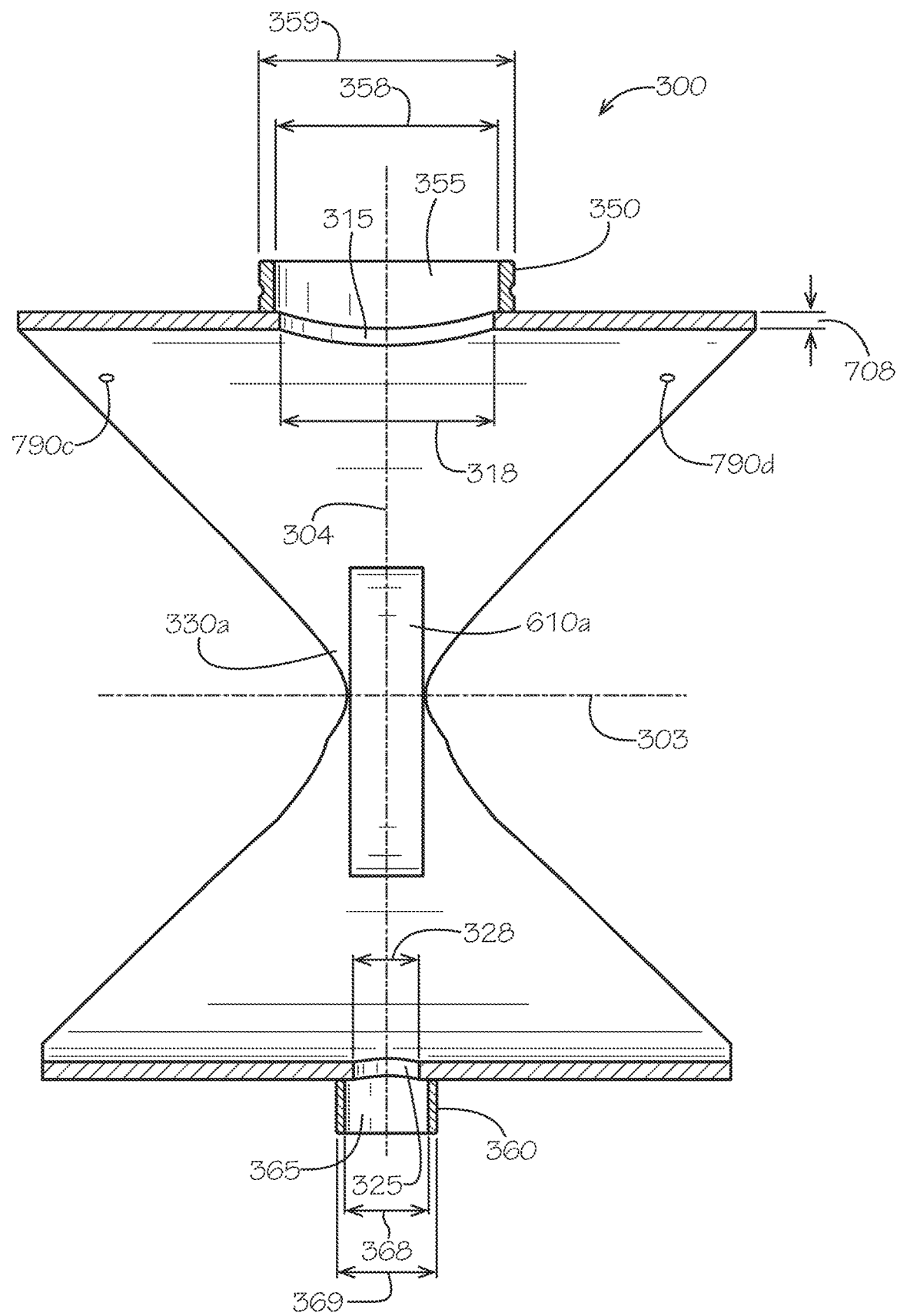
FIG. 7 is a sectional view of the plug of FIG. 2 taken along line 7-7 of FIG. 6.

FIG. 7 shows a sectional view of the plug 300. The plug 300 can define a plurality of holes 790a, b, c, d (790a,b shown in FIG. 8), which can be sized to receive the respective fasteners 390a, b, c, d. A width of the stiffener 610a,b can be made equal to a width of the corresponding web portion half 330a. The top bore 315 can define the bore diameter 318, and the spring boss 350 can define the spring boss bore 355, which can define a bore diameter 358 and an outer boss diameter 359. Likewise, the bottom bore 325 can define the bore diameter 328, and the plug boss 360 can define the plug boss bore 365, which can define a bore diameter 368 and an outer boss diameter 369.

Figure 9:
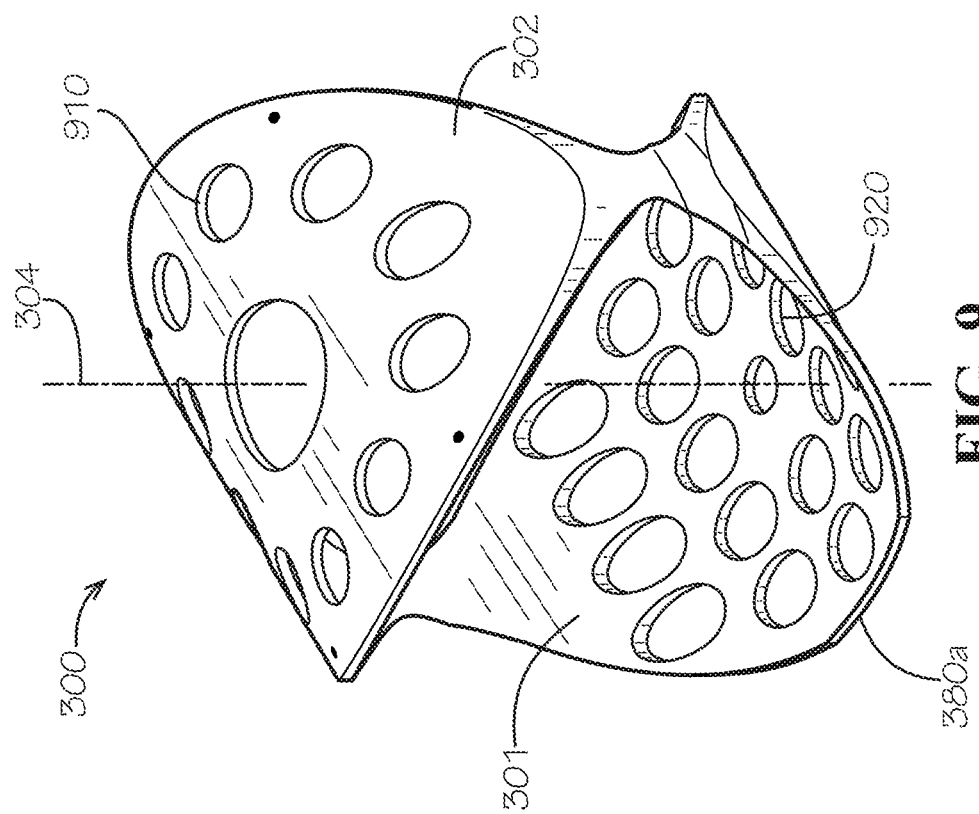
FIG. 9 is a perspective view of the plug of FIG. 8 in accordance with another aspect of the current disclosure.
Figure 8:
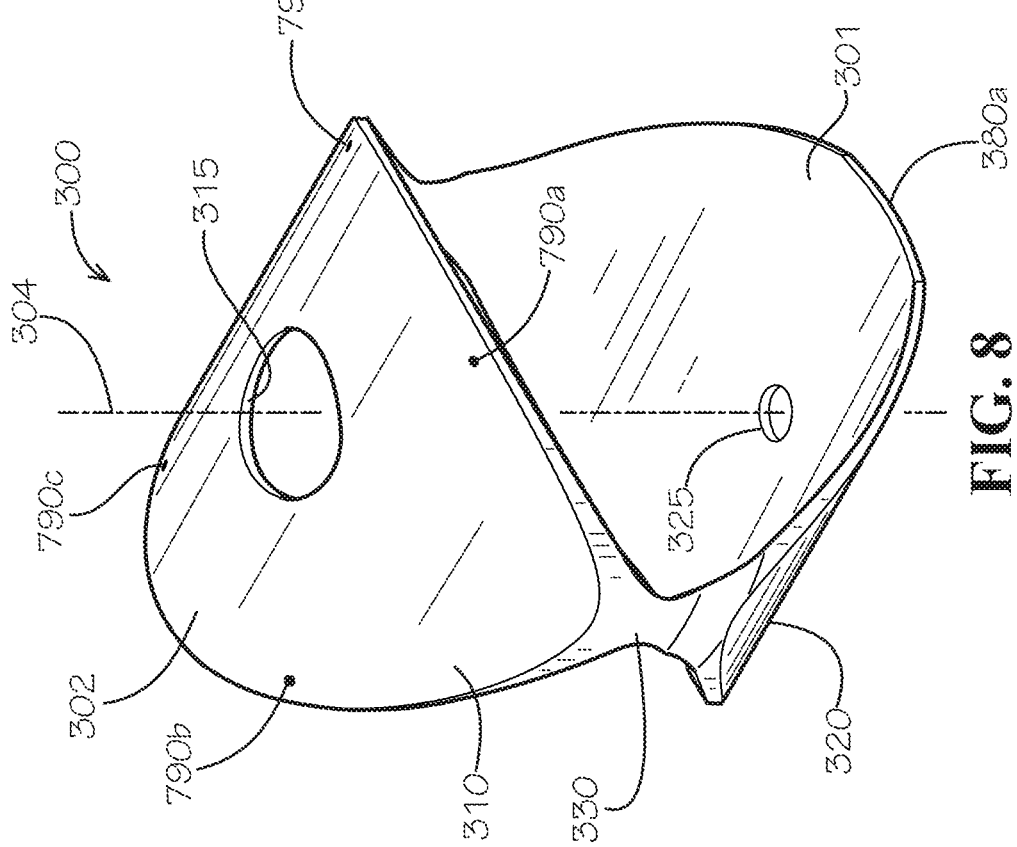
FIG. 8 is a perspective view of the plug of FIG. 2 in an unassembled state.

In various aspects, FIGS. 8 and 9 show the plug 300 without the spring boss 350, the plug boss 360, the positioning members 370a, b, c, d, or the stiffeners 610a,b. The top bore 315 can be aligned with the bottom bore 325 along the transverse axis 304. As shown in FIG. 9, each of the top portion 310 and the bottom portion 320 can define a plurality of flow bores 910,920, respectively, which as described below can permit flow of fluid in the fluid system through the top portion 310 and the bottom portion 320 of the plug 300 into, e.g., the fitting 150 or a branch line 1300 (shown in FIG. 15) of the pipe system 50. Each of the plurality of flow bores 910,920 can be made to extend from an outer surface 302 of the plug 300 to an inner surface 301 of the plug 300.

Figure 10:
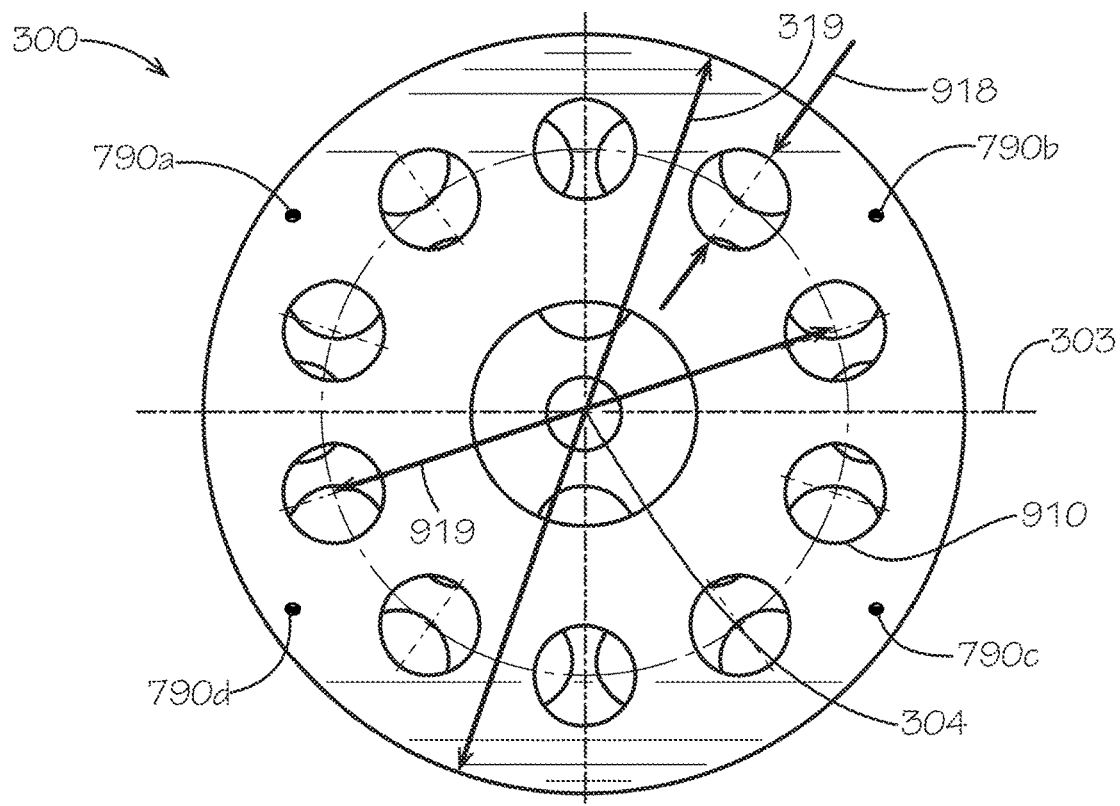
FIG. 10 is a top view of the plug of FIG. 9.
Figure 11:
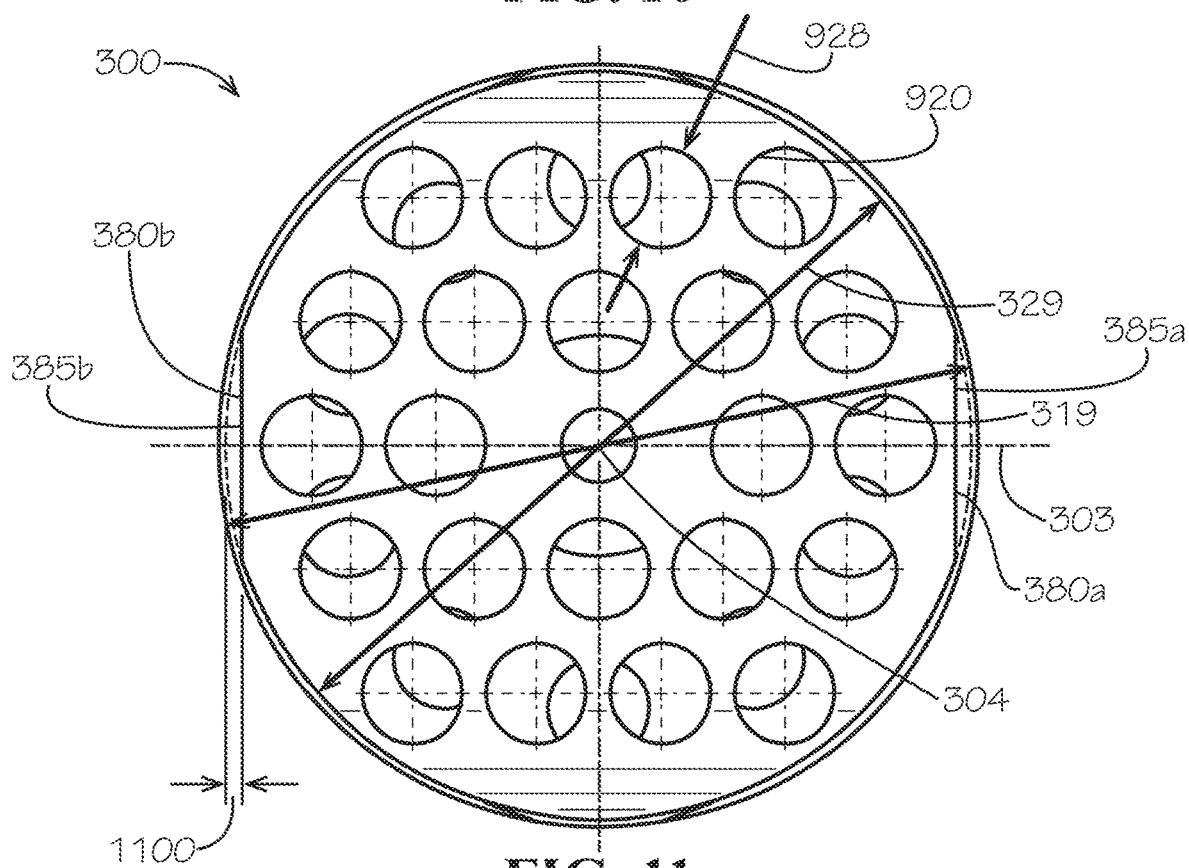
FIG. 11 is a bottom view of the plug of FIG. 9.

As shown in FIG. 10, each of the flow bores 910 can define a diameter 918. Likewise, as shown in FIG. 11, each of the flow bores 920 can define a diameter 928. In some aspects, as shown in FIG. 10, each of the flow bores 910 (or, in other aspects, the flow bores 920) can be arranged in a circular pattern defining a pattern diameter 919. In other aspects, as shown in FIG. 11, each of the flow bores 920 (or, in other aspects, the flow bores 910) can be arranged in rows such that the flow bores 920 are staggered as shown to maximize open area. In yet other aspects, the flow bores 910,920 can be arranged in any other pattern such as, for example and without limitation, multiple circular patterns, flow bores 910,920 having different diameters, and partially overlapping flow bores 910,920. The flow bores 910,920 can define a non-circular shape such as an elongated slot or a rectangular or other opening in other aspects. The flow bores 910,920 can be arranged without or with staggering. In yet other aspects, the flow bores 910,920 can be arranged without any identifiable pattern. In some aspects, as shown, the bore hole surfaces of the flow bores 910,920 can be formed in a direction parallel to the transverse axis 304 (i.e., vertically). In other aspects, the bore hole surfaces of the flow bores 910,920 can be formed perpendicular to a portion of the inner surface 301 or the outer surface 302 in which the respective flow bore 910,920 is defined. As shown in both FIGS. 10 and 11, the top portion 310, the bottom portion 320, and the web portion 330 can define a substantially circular shape around the transverse axis 304 of the plug 300.

As shown in FIG. 11, the truncated ends 380a,b of the bottom portion 320 can define edges 385a,b offset a distance 1100 from the otherwise circular shape of the bottom portion 320 formed by the bottom diameter 329. In one aspect, as shown, each of the edges 385a,b can be flat or straight. In another aspect, each of the edges 385a,b can be curved such one or both of the edges 385a,b can be closer to or further from the bottom diameter 329.

Figure 13:
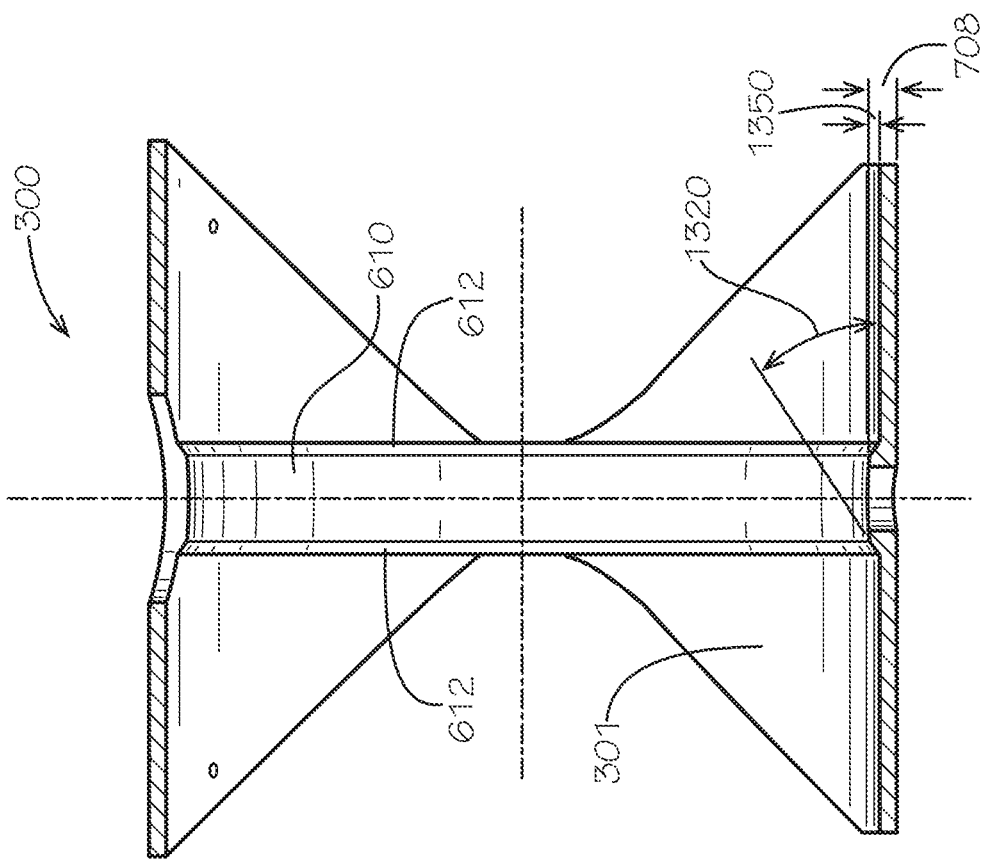
FIG. 13 is a sectional view of the plug of FIG. 12 taken along line 13-13 of FIG. 12.
Figure 12:
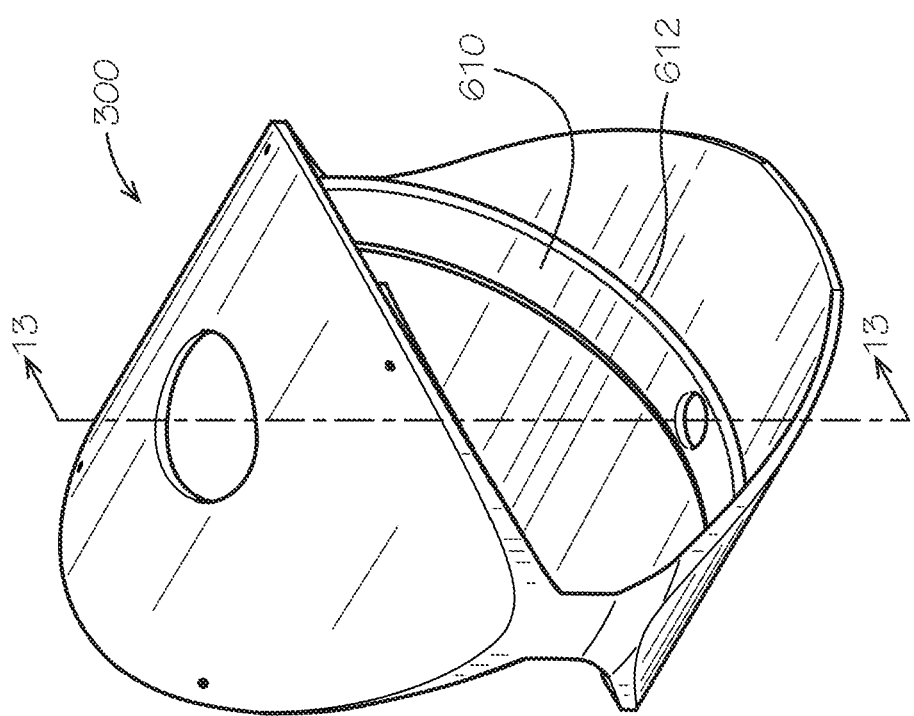
FIG. 12 is a perspective view of the plug of FIG. 8 in accordance with another aspect of the current disclosure.

FIGS. 12 and 13 show a plug, again without the spring boss 350, the plug boss 360, or the positioning members 370a, b, c, d. As shown, a stiffener 610 can be formed from the walls of the plug 300. In one aspect, a plug wall with the original thickness 708 can be machined at each axial end of the plug such that the plug 300 including the stiffener 610 is monolithic. Machining various versions of the plug 300 from a pipe material having a common thickness 708 to form an integral stiffener 610 can have the benefit of reduced inventory of the pipe material used to form the various versions of the plug 300 and provide flexibility for a wider variety of sizes. For example and without limitation, the thickness 708 of the pipe material used to form the plug can be as much as 0.375" or greater. In another aspect, the plug 300 can be formed with the integral stiffener 610 without machining by a process such as, for example and without limitation, casting or molding. Once formed, as shown in FIG. 13, the stiffener 610 can define a stiffener height 1350 measured from a radially outermost portion of the inner surface 301 of the plug 300. The stiffener 610 can further define edge treatments 612, each of which can be a chamfer defining a surface angled with respect to the inner surface 301 in cross-section as shown by an angle 1320.

Figure 14:
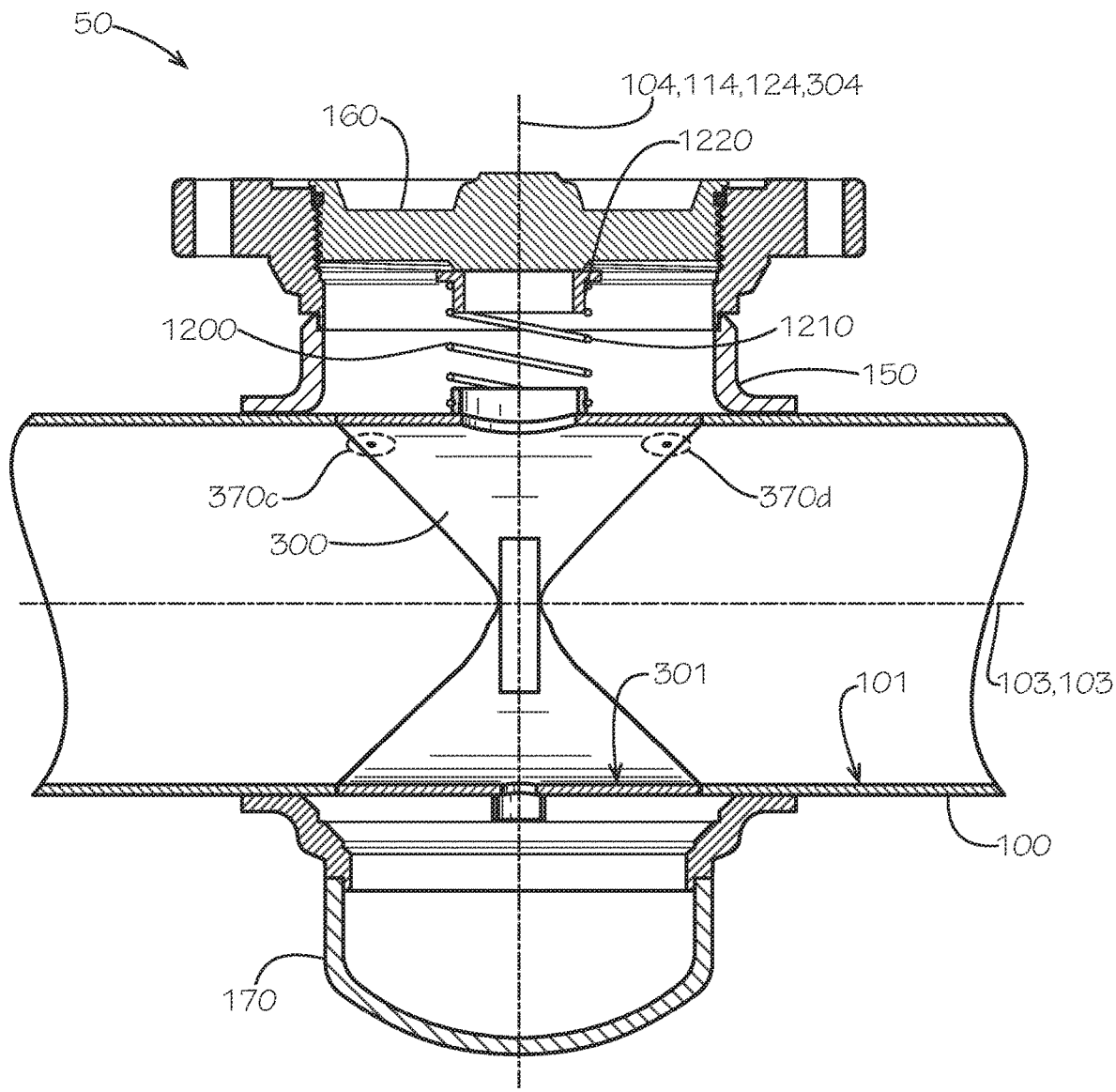
FIG. 14 is a sectional view of the system of FIG. 2 taken along line 1-1 of FIG. 2 and further comprising the plug of FIG. 2 as installed.
Figure 15:
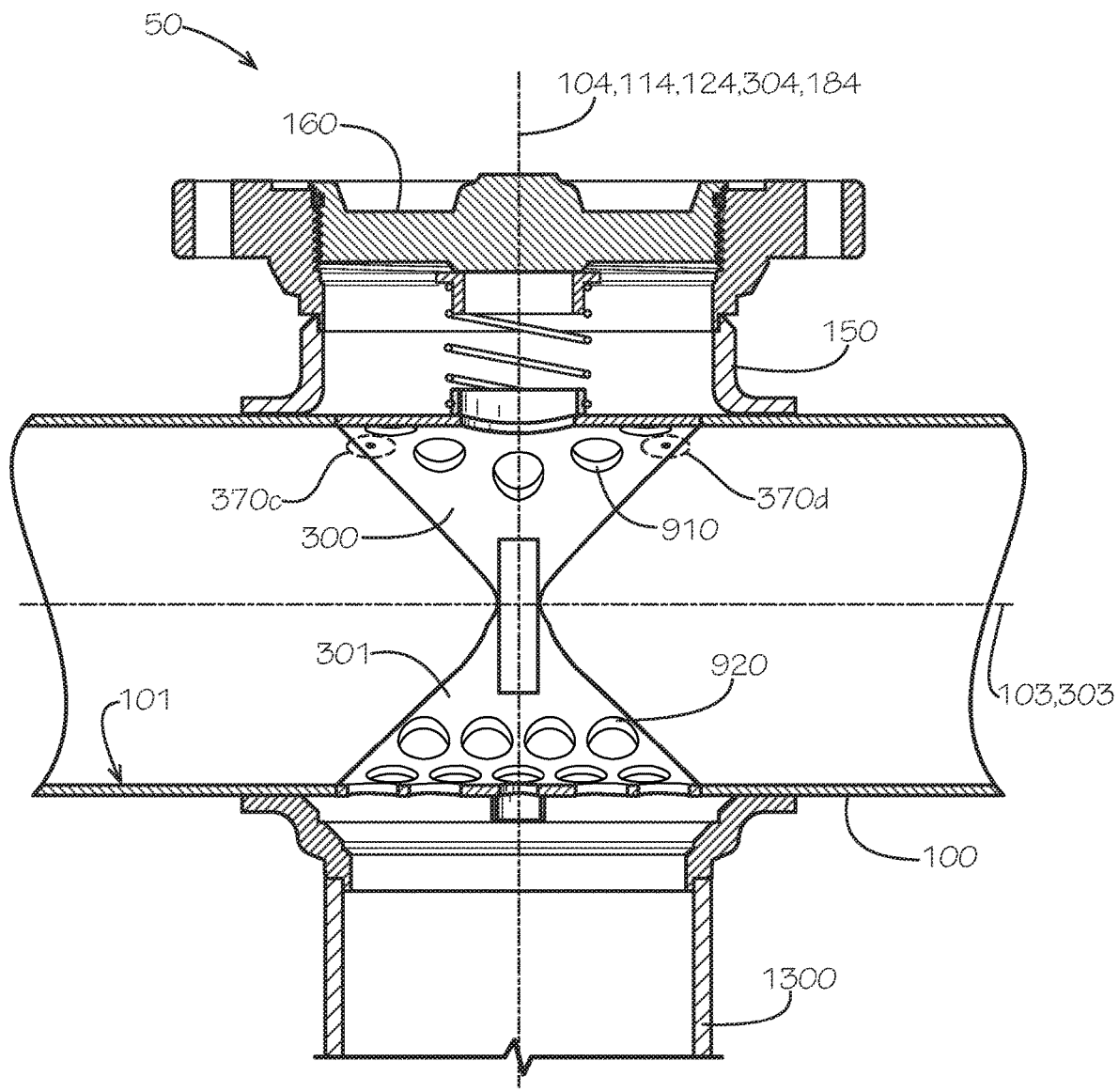
FIG. 15 is a sectional view of the system of FIG. 2 in accordance with another aspect of the current disclosure taken along line 1-1 of FIG. 2 and further comprising the plug of FIG. 9 as installed.

FIGS. 14 and 15 show two aspects of the pipe system 50 comprising the plug 300 positioned inside the fitting 150. FIG. 14 specifically shows the plug 300 without the flow bores 910,920 positioned inside the fitting 150, while FIG. 15 shows the plug 300 with the flow bores 910,920. A biasing assembly 1200 comprising a biasing element 1210 and a cap 1220 can be positioned between the top portion 310 of the plug 300 and the completion plug 160 to bias the plug 300 towards its aligned position in the pipe 100. A first end of the biasing element 1210 can be captured inside the groove 353 (shown in FIG. 6) of the spring boss 350 (shown in FIG. 6), while a second end of the biasing element 1210 can be captured inside the cap 1220. In other aspects, the biasing element 1210 can directly contact the outer surface 302 of the plug 300 and can directly contact a surface of the completion plug 160.

The biasing element 1210 can hold the plug 300 in alignment with the pipe 100 with a compression force induced by contact of the completion plug 160 with the biasing element 1210. In some aspects, the biasing element 1210 can be a coil spring. In other aspects, the biasing element 1210 can be another type of spring such as, for example and without limitation, a leaf spring, a wave spring, or any other compressible material or device. As shown, when the plug 300 is in its aligned position, the inner surface 301 of the plug 300 can be made to sit flush with the inner surface 101 of the pipe 100 around the circumference of the inner surface 301 of the plug 300. Flush alignment between the inner surface 301 of the plug 300 and the inner surface 101 of the pipe 100 can facilitate passage of the pig 200 through the pipe 100, including where the plug 300 is installed in the fitting 150. The presence of the stiffeners 610, which have a thickness and can extend radially inward from the inner surface 301 of the plug 300, do not interfere with the pig 200 because of their relatively low profile. In some aspects, one or more edges of the stiffeners 610 can be rounded or chamfered in axial directions relative to the longitudinal axis 303 to further facilitate passage of the pig.

FIG. 15 shows the pipe system 50 further comprising the branch line 1300 extending from the fitting 150 in a direction angled with respect to the longitudinal axis 103 of the pipe 100 and the plug 300 defining a plurality of flow bores 910,920 in a portion of the plug 300 facing the branch line 1300.

Figure 16:
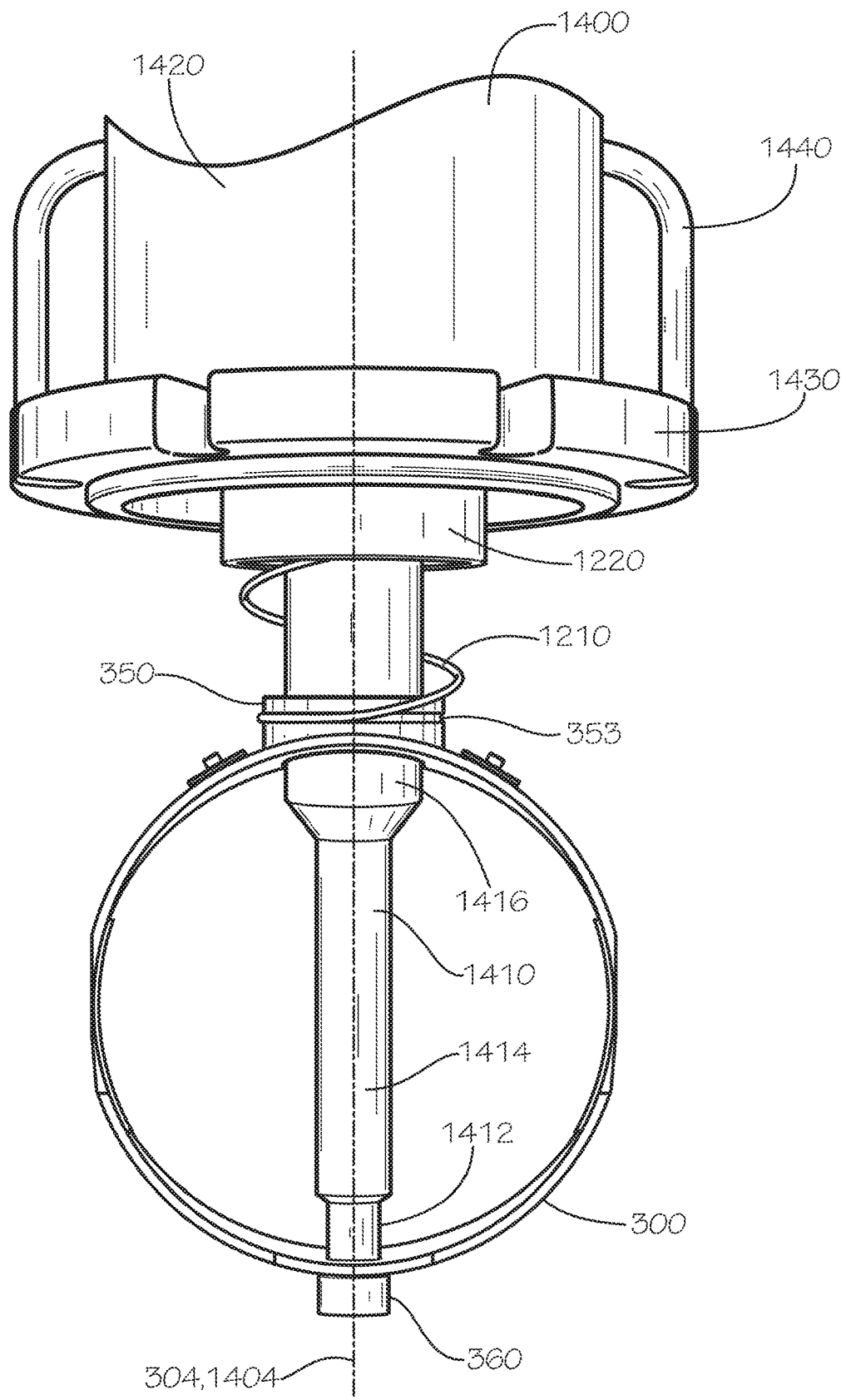
FIG. 16 is a front perspective view of the plug of FIG. 2 mounted on a plug installation tool.

FIG. 16 shows a plug 300 assembled to a plug installation tool 1400 in preparation for installation of the plug 300 into the pipe system 50. The plug installation tool 1400 can comprise a body 1420 with handles 1440 and a flange 1430. When an axis 1404 of the plug installation tool 1400 is aligned with the transverse axis 304 of the plug 300, an assembly shaft 1410 of the plug installation tool 1400 can be inserted into the plug 300. More specifically, an end portion 1412 of the assembly shaft 1410 can be configured to fit inside the plug boss 360 as shown and a shoulder portion 1416 of the assembly shaft 1410 can be configured to fit inside the spring boss 350. A middle portion 1414 of the assembly shaft 1410 can join the end portion 1412 and the shoulder portion 1416. During installation, with the plug 300 assembled around the assembly shaft 1410 of the plug installation tool 1400, the transverse axis 304 of the plug 300 can be aligned with the transverse axis 104 of the pipe 100 and the plug 300 inserted into the pipe 100 in order to position the plug 300 into the fitting and into the pipe 100. As desired, the flange 1430 of the plug installation tool 1400 can be used to mount the plug installation tool 1400 to the fitting 150.

In other aspects, the pipe 100 can define only a top aperture 110 and the plug 300 can comprise only the top portion 310 and optionally at least a portion of the web portion 330. For example and without limitation, a shell cutter or other tool can be used to cut an opening such as the top aperture 110 in only one side of the pipe 100, in which case a smaller plug without a bottom portion 320 can be sufficient to plug the only opening, the top aperture 110. In yet other aspects, the pipe 100 can define only a bottom aperture 120 and the plug 300 can comprise only the bottom portion 320 and optionally at least a portion of the web portion 330. In some aspects, the plug 300 can be installed from the top. In other aspects, the plug 300 can be installed from the bottom.

In some aspects, the plug 300 can be formed from metal and specifically can be formed from the same material from which the pipe 100 is formed. In other aspects, the plug 300 can comprise another material such as, for example and without limitation, a plastic or a ceramic. A material such as used in the plug 300 can exhibit a variety of mechanical properties including a yield strength. In some aspects, the yield strength in tension of the material is equal to between 48,000 and 80,000 psi (between approximately 331 MPa and approximately 552 MPa). The plug 300 can be a monolithic piece of material, i.e., the plug 300 can be formed from or into a single piece of material. In some aspects, as shown, the plug 300 is installed in both the pipe 100 and in the fitting 150. In other aspects, the plug 300 is only installed in the pipe 100.

A method of manufacturing the plug 300 for the pipe system 50 can comprise cutting a plug 300 from a length of pipe material used to form the pipe 100. In some aspects, cutting the plug 300 can comprise cutting with an electrical discharge machining (EDM) process. Cutting the plug 300 can comprise cutting the top diameter 319 of the plug 300 greater than the bottom diameter 329 of the plug 300.

The method can further comprise securing stiffeners 610a,b to the main bore 340 of the plug 300 proximate to the web portion of the plug 300 to reinforce the plug 300 at the web portion 330. The method can further comprise securing a plurality of positioning members 370a, b, c, d to an outer surface 302 of the top portion 310 of the plug 300.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A method of manufacturing a plug for a pipe system, the method comprising:
   cutting a plug from a length of pipe, the length of pipe defining a pipe bore, the pipe bore defining an inner diameter equal to an inner diameter of a main bore of the plug, the plug comprising a top portion defining a top diameter, a bottom portion defining a bottom diameter, and a web portion joining the top portion and the bottom portion.

2. The method of claim 1, further comprising forming a stiffener in the main bore of the plug proximate to the web portion of the plug to reinforce the plug at the web portion.

3. The method of claim 2, wherein forming the stiffener comprises forming the stiffener separately from the plug and securing the stiffener to the plug.

4. The method of claim 1, further comprising forming a plurality of plug bores in a one of the top portion and the bottom portion.

5. The method of claim 4, wherein each of the plurality of plug bores extends from an outer surface of the plug to an interior surface of the plug.

6. The method of claim 4, wherein each of the plurality of plug bores is circular.

7. The method of claim 4, wherein the plurality of plug bores defines a pattern.

8. The method of claim 1, wherein cutting the plug comprises cutting the plug with an electrical discharge machining (EDM) process.

9. The method of claim 1, wherein cutting the plug comprises cutting the plug from metal.

10. The method of claim 1, wherein cutting the plug comprises cutting the top diameter of the plug greater than the bottom diameter of the plug.

11. The method of claim 1, further comprising securing a plurality of positioning members to an outer surface of the top portion of the plug.

12. The method of claim 11, wherein securing the plurality of positioning members comprises welding each of the positioning members to the outer surface of the top portion.

13. The method of claim 11, wherein securing the plurality of positioning members comprises securing each of the positioning members to the outer surface of the top portion with a fastener.

14. The method of claim 11, wherein securing the plurality of positioning members comprises positioning each of the positioning members to extend beyond the edge of the top portion of the top portion by an extension distance.

15. The method of claim 1, further comprising forming a top bore in the top portion.

16. The method of claim 1, further comprising forming a bottom bore in the bottom portion.

17. The method of claim 1, further comprising securing a spring boss to the top portion.

18. The method of claim 17, wherein securing the spring boss to the top portion comprises welding the spring boss to the top portion.

19. The method of claim 1, further comprising securing a plug boss to the bottom portion.

20. The method of claim 19, wherein securing the plug boss to the bottom portion comprises welding the plug boss to the bottom portion.

* * * * *